United States Patent Office 3,334,093
Patented Aug. 1, 1967

3,334,093
PHENOTHIAZINYLALKYL ETHERS
John S. Driscoll, Lynnfield, Mass., assignor to Monsanto Research Corporation, St. Louis, Mo., a corporation of Delaware
No Drawing. Filed June 23, 1965, Ser. No. 466,422
6 Claims. (Cl. 260—243)

This invention relates to new compounds, and more particularly, to new phenothiazinylalkyl ethers.

In accordance with the present invention, there are now provided novel phenothiazinylalkyl ethers of the formula

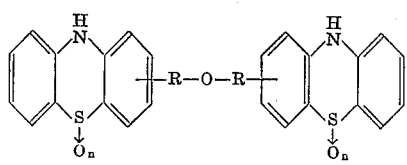

wherein R is a lower saturated aliphatic hydrocarbon radical, of up to 6 C atoms, and $n$ is an integer of from 0 to 2.

Illustrative of the presently provided novel compounds are, for example, 1,1'-(oxydimethylene)diphenothiazine,
2,2'-(oxydimethylene)bis(phenothiazine-5,5-dioxide),
1,1'-(oxy-bis[methylmethylene])diphenothiazine,
4,4'-(oxybis[methylmethylene])bis(phenothiazine-5,5-dioxide),
4,4'-(oxydiethylene)-diphenothiazine,
3,3'-(oxydiethylene)bis(phenothiazine-5,5-dioxide),
1,1'-(oxybis[ethylmethylene])diphenothiazine,
2,2'-(oxybis[ethylmethylene])bis(phenothiazine-5,5-dioxide),
1,1'-(oxydipropylene)diphenothiazine,
4,4'-(oxybis[isopropylmethylene])bis(phenothiazine-5,5-dioxide),
4,4'-(oxydibutylene)diphenothiazine,
2,2'-(oxybis[t-butylmethylene])bis(phenothiazine-5,5-dioxide),
1,1'-(oxydiphentamethylene)diphenothiazine,
1,1'-(oxybis[diethylmethylene])diphenothiazine,
1,1'-(oxydihexamethylene)diphenothiazine,
1,1'-(oxydihexamethylene)bis(phenothiazine-5,5-dioxide),
1,1'-(oxybis[n-pentylmethylene])diphenothiazine,
4,4'-(oxybis[2-butylethylene])diphenothiazine,
1,1'-(oxybis[isoamylmethylene])bis(phenothiazine-5,5-dioxide), and so forth.

The 1,1'-(oxydialkylene)diphenothiazine compounds are especially preferred, and particularly those in which a single carbon atom intervenes between the phenothiazine nucleus and the ether oxygen atom.

The presently provided novel phenothiazinylalkyl ethers are prepared by treating a phenothiazinealkanol with a halogen acid, as represented by the following equation:

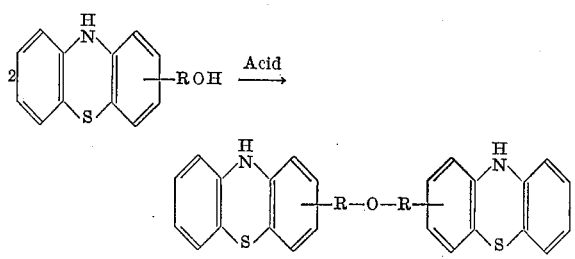

The mechanism of the equation is believed to be as follows:

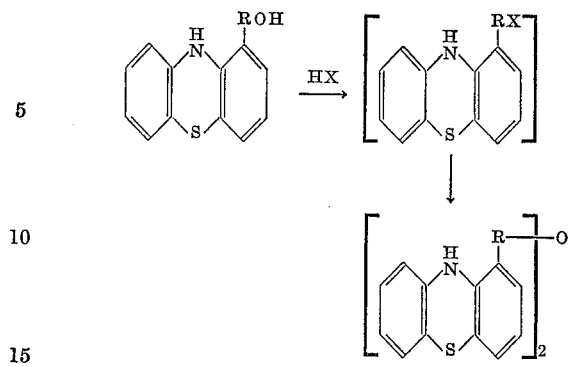

The resulting ethers are conveniently converted to the 5,5-dioxide (S,S-dioxide) by subsequent oxidation, as further described hereinafter.

Exemplary of phenothiazinealkanols useful in the preparation of the presently provided ethers are, for example, 1-phenothiazinemethanol,
1-phenothiazine-α-methylmethanol,
2-phenothiazineethanol,
3-phenothiazinemethanol,
4-phenothiazine-α-ethylmethanol,
1-phenothiazineethanol,
1-phenothiazine-α-methylethanol,
1-phenothiazinepropanol,
2-phenothiazine-α-methylmethanol,
4-phenothiazinebutanol,
1-phenothiazine-α-n-propylmethanol,
3-phenothiazine-β-ethylethanol,
1-phenothiazineheptanol,
1-phenothiazinehexanol,
1-phenothiazine-α-isopropylmethanol, and so forth.

Any of a wide variety of halogen acids can be employed to effect the stated conversion of an alcohol such as those mentioned above to the ether product. In particular strong halogen acid having been found effective such as any of the hydrohalides—HCl, HBr and HI—or organic acid halides, particularly hydrocarbon-sulfonyl halides including, for example, methanesulfonyl chloride, toluenesulfonyl chloride, methanesulfonyl bromide, ethanesulfonyl chloride, benzenesulfonyl chloride, toluenesulfonyl iodide, and the like, or indeed, phosphorus halides such as triphenylphosphite dibromide, triphenylphosphite dichloride, tritolylphosphite dibromide, tributylphosphite dichloride, or other trishydrocarbylphosphite dihalides.

To effect synthesis of the desired ether from the corresponding phenothiazinealkanol, the alcohol is contacted in solution with the acid. Only a catalytic amount of acid is needed, less than 0.1 mole per mole of the phenothiazine-alcohol, although more can be used if desired, up to an equimolar amount or more, such as double this amount. Useful solvents depend on the nature of the phenothiazinealkanol; this type of compound is not generally very soluble in the usual organic solvents, but can be dissolved in such weakly acidic solvents as glacial acetic acid. Temperatures of the reaction may vary from down to just above the freezing point of the reaction mixture up to just below the decomposition temperatures of the reaction mixture components, but temperatures in the range of 0° to 100° C. are usually suitable, and the reaction proceeds readily at ambient temperature (65–80° F.). Pressure variation can also be used, ranging from subatmospheric pressures as low as 0.5 mm. Hg to superatmospheric pressures as high as 5000 p.s.i.g., but atmospheric pressure is convenient and suitable. In general, merely contacting the reactants produces formation of the ether, which will usually precipitate from solution spontaneously. Ordinary procedures such as filtration, extraction and the like can be employed to recover the ether.

To convert the resulting ether to the 5,5-dioxide, it is treated with oxidizing agents, such as hydrogen peroxide, chromic oxide, potassium permanganate or the like, generally in an inert organic solvent or diluent, such as ethanol, ethylene glycol, glacial acetic acid or the like. This reaction is usually conducted using at least 2 moles of the oxidant per mole of the ether, and greater amounts, up to say 10 moles of oxidant, may be used if desired. In this case, heating to temperatures above room temperature, such as reflux temperatures in the range of 50–100° C. may be advantageous in facilitating the reaction, though the wider temperature range mentioned in discussing formation of the ether is applicable, as is the pressure range there discussed. To recover the product, the reaction mixture is conveniently mixed with cold water and the product recovered by usual means.

The presently provided novel ethers are generally stable and solid materials, which are useful for a wide variety of purposes. In particular, they may be used as physiological agents, to produce antihistaminic, urinary antiseptic, antiemetic, and anesthetic effects, for example, or as polymerization inhibitors, to prevent or moderate the heat- or peroxide-initiated polymerization of vinyl monomers such as styrene, vinyl chloride, and so forth.

The invention is illustrated but not limited by the following examples.

*Example 1*

This example illustrates prepartion of an ether of the present invention.

To a solution of 0.57 gram (g.) of 1-phenothiazinemethanol in 10 milliliters (ml.) of glacial acetic acid is added one drop of concentrated hydrochloric acid. On stirring the mixture at room temperature, a precipitate appears within ½ hour: stirring is continued, at room temperature, for 18 hours, after which the precipitate is filtered off and washed with diethyl ether. The 1,1'-(oxydimethylene)diphenothiazine recovered as the product is a tan solid which, after drying 24 hours at 100° C./0.1 mm. Hg, melts above 320° C. The elemental analysis of this product corresponds to the assigned formula $$C_{26}H_{20}N_2OS_2$$

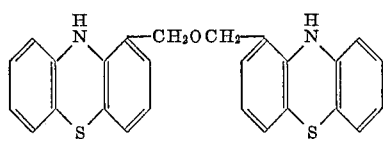

*Example 2*

This example illustrates another preparation of a phenothiazinylalkyl ether in accordance with the present invention.

1-phenothiazinemethanol is prepared by extracting 4.9 g. of 1-carboxyphenothiazine in a Soxhlet apparatus for 24 hours with 250 ml. of a dry diethyl ether solution of 2.75 g. of lithium aluminum hydride, adding 100 ml. of water to the resulting suspension, acidifying the diluted suspension with 10 ml. of concentrated sulfuric acid in 40 ml. of water, and extracting the acidified aqueous reaction mixture with diethyl ether. Evaporation of the ether extracts gives 1-phenothiazinemethanol as a light yellow solid, which is purified by boiling with charcoal in methanol, diluting the hot filtered solution with hot water, and cooling to provide the purified alcohol as white needles, m. 100–100.5° C.

A filtered solution of 5.0 ml. of concentrated hydrochloric acid in 10 ml. of glacial acetic acid is added, over a five-minute period, to a twice-filtered, stirred solution of 1.15 g. of 1-phenothiazinemethanol in 10 ml. of glacial acetic acid, producing immediate formation of a yellow precipitate. The mixture is stirred at room temperature 5 minutes and filtered, and the precipitate washed with 25 ml. of filtered glacial acetic acid. It is 1,1'-(oxydimethylene)diphenothiazine.

*Example 3*

This example describes another preparation of an ether as provided by this invention.

To a solution of 0.23 g. of 1-phenothiazinemethanol in 2.3 ml. of glacial acetic acid is added 0.34 g. of 48% (aqueous) hydroiodic acid in 1.0 ml. of glacial acetic acid, over a period of 2 minutes. The resulting mixture is stirred at room temperature for 10 minutes and then filtered to separate the yellow precipitate, which is washed with water and dried. The product is 1,1'-(oxydimethylene)diphenothiazine, m. >320° C.

*Example 4*

The procedure of the above examples is followed, except that the acid halide used is hydrobromic acid. Again the (oxydimethylene)diphenothiazine is obtained.

Substituting either methanesulfonyl chloride or triphenylphosphite dibromide for the hydrogen halide acids of the preceding examples gives the same ether.

Following a procedure as described above, but employing 1-phenothiazine-α-methylmethanol as the alcohol, the product is 1,1'-(oxybis[methylmethylene]diphenothiazine; employing 3-phenothiazinemethanol, it is 3,3'-(oxydimethylene)diphenothiazine.

*Example 5*

This example illustrates preparation of a 5,5-dioxide of a phenothiazinylalkyl ether of this invention.

A mixture of 1 g. of 1,1'-(oxydimethylene)-diphenothiazine, 3 ml. of 27% aqueous hydrogen peroxide and 30 ml. of glacial acetic acid is stirred and refluxed for 5 hours. Then the reaction mixture is poured into 100 ml. of cold water. The product is 1,1'-(oxydimethylene) diphenothiazine-5,5-dioxide of the formula

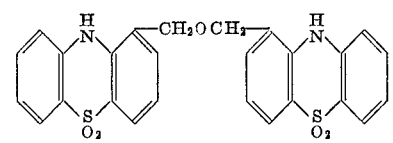

*Example 6*

This example illustrates utilization of an ether of this invention as a physiological agent.

An aqueous dispersion of 1,1'-(oxydimethylene)diphenothiazine is administered intravenously to mice at concentrations up to about 350 mg./kg., and dilutions of up to 35 ml./kg. The effects exhibited by the mice are characteristic of central nervous system depressants.

*Example 7*

To styrene is added a concentration of 0.5–1.0 parts per hundred of 1,1'-(oxydimethylene)diphenothiazine. The monomer is polymerized neither by heat nor by addition of a peroxide polymerization catalyst such as benzoyl peroxide. Removal of the inhibiting phenothiazinylmethyl ether is effected by percolating the inhibited monomer through a bed of an activated bentonite clay (magnesium aluminosilicate), after which the monomer is readily polymerizable.

While the invention has been described with particular reference to specific preferred embodiments thereof, it will be appreciated that modifications and variations can be made without departing from the scope of the invention as disclosed herein, which is limited only as indicated in the following claims.

What is claimed is:
1. A phenothiazinylalkyl ether of the formula

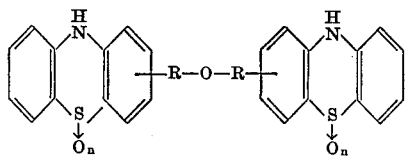

wherein —R—O—R— is attached to the same position on each phenothiazine ring and each R is a saturated aliphatic hydrocarbon radical of up to 6 carbon atoms and each $n$ is an integer selected from 0 and 2.

2. An ether of claim 1 wherein a single carbon atom intervenes between the oxygen atom and the phenothiazine rings.

3. An ether of claim 1 in which each R is a methylene radical.

4. An ether of claim 1 in which $n$ is 0.

5. An ether of claim 1 in which the oxydialkylene radical is attached to the 1-position of each phenothiazinyl nucleus.

6. 1,1'-(oxydimethylene)diphenothiazine.

No references cited.

WALTER A. MODANCE, Primary Examiner.

HARRY I. MOATZ, Assistant Examiner.